(12) United States Patent
Itou (10) Patent No.: US 6,415,981 B1
(45) Date of Patent: Jul. 9, 2002

(54) OPTICAL READER WITH REDUCED-SIZED OPTICAL SENSOR CONFIGURATION

(75) Inventor: Kunihiko Itou, Chiryu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/414,826

(22) Filed: Oct. 8, 1999

(30) Foreign Application Priority Data

Nov. 26, 1998 (JP) ............................................ 10-335947

(51) Int. Cl.[7] ................................................. G06K 7/10
(52) U.S. Cl. ............. 235/472.01; 235/454; 235/462.11; 235/462.45
(58) Field of Search ............................ 235/472.01, 454, 235/462.25, 462.45, 462.11, 462.21, 462.01, 462.08, 462.49, 472.03

(56) References Cited

U.S. PATENT DOCUMENTS

| | | | | |
|---|---|---|---|---|
| 4,031,358 A | * | 6/1977 | Thorniley | 235/61.11 E |
| 5,081,343 A | * | 1/1992 | Chadima, Jr. et al. | 235/472 |
| 5,373,282 A | * | 12/1994 | Carter | 235/382 |
| 5,422,472 A | * | 6/1995 | Tavislan et al. | 235/472 |
| 5,446,272 A | * | 8/1995 | Barkan | 235/462 |
| 5,448,050 A | * | 9/1995 | Kostizak | 235/472 |
| 5,602,379 A | * | 2/1997 | Uchimura et al. | 235/472 |
| 5,783,812 A | * | 7/1998 | Chung | 235/472 |
| 5,783,813 A | * | 7/1998 | Metlitsky et al. | 235/472 |
| 5,786,585 A | * | 7/1998 | Eastman et al. | 235/472 |
| 5,811,773 A | * | 9/1998 | Bard et al. | 235/454 |
| 5,811,778 A | * | 9/1998 | Itou et al. | 235/462 |
| 5,874,722 A | * | 2/1999 | Rando et al. | 235/472 |
| 5,907,145 A | * | 5/1999 | Krichever et al. | 235/462.44 |
| 5,992,746 A | * | 11/1999 | Suzuki | 235/462.21 |
| 5,992,750 A | * | 11/1999 | Chadima, Jr. et al. | 235/472.01 |
| 6,000,617 A | * | 12/1999 | Swartz et al. | 235/462.2 |
| 6,068,189 A | * | 5/2000 | Mazzone | 235/462.23 |

FOREIGN PATENT DOCUMENTS

| | | | |
|---|---|---|---|
| EP | 0488202 A1 | * | 6/1992 |
| JP | 363225884 | * | 9/1988 |
| JP | 406162243 | * | 6/1994 |
| JP | 7-210622 | | 8/1995 |
| JP | 8-202805 | | 8/1996 |
| JP | 10-20805 | | 1/1998 |

* cited by examiner

Primary Examiner—Thien M. Le
Assistant Examiner—U Chuan Le
(74) Attorney, Agent, or Firm—Harness, Dickey and Pierce, P.L.C.

(57) ABSTRACT

An optical reader having a reduced thickness due to an optical sensor configuration that is reduced in height compared to conventional optical sensor configurations. A sensor aperture in which the optical sensor is mounted and a lens-barrel aperture through which a lens-barrel that houses the reader optical imaging system is inserted are defined in a mounting substrate. The optical sensor is mounted in the sensor aperture so that a part thereof protrudes below the mounting substrate, and the lens-barrel is mounted in the lens-barrel aperture so that a part thereof protrudes below the mounting substrate. Because the optical sensor is disposed in the above manner, the space required above the mounting substrate to house the sensor is equal to the height of the optical sensor.

23 Claims, 6 Drawing Sheets

OPTICAL READER WITH REDUCED-SIZED OPTICAL SENSOR CONFIGURATION

CROSS-REFERENCE TO RELATED APPLICATION

The present application is related to, and claims priority from, Japanese Patent Application No. Hei. 10-335947, the contents of which are incorporated herein by reference.

BACKGROUND OF THE INVENTION

1. Field of the Invention

The present invention relates to bar code readers, and more particularly to a bar code reader whose thickness is reduced as a whole due to the location and size of its optical sensor configuration.

2. Description of the Related Art

A conventional bar code reader utilizes an optical reader for illuminating a bar code affixed to a product. The bar code reader light images the bar code from light reflected from the bar code via an optical imaging system, and then reads the bar code image via an optical sensor, such as a CCD array, disposed at a predetermined reading position within the reader.

Figure 6A:
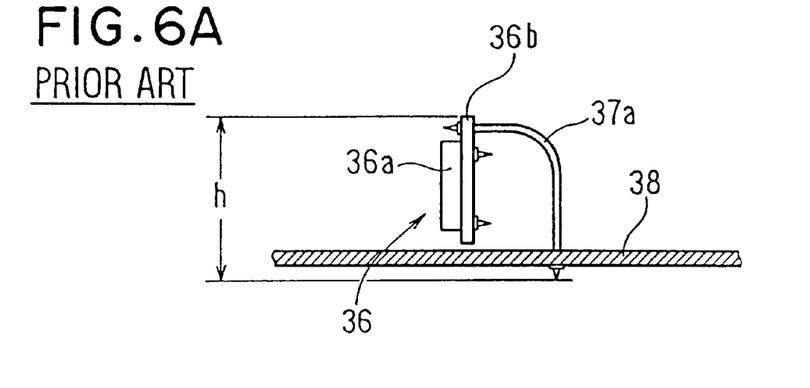
FIGS. 6A–6C are side elevation views of optical reader configurations according to the prior art.

In a conventional reader such as the one just described, the optical sensor is configured in a manner such as that shown in FIG. 6A. As shown, the optical sensor 36 is composed of a sensor body and a sensor substrate. A flat wire 37a is soldered to the sensor substrate at one end and to a mounting substrate 38 at the other end to affix the optical sensor 36 to the mounting substrate 38. The total component height h including the optical sensor 36 and the mounting substrate 38 is the distance from the lower end of the flat wire protruding from the mounting substrate 38 to the upper end of the sensor substrate.

Figure 6B:
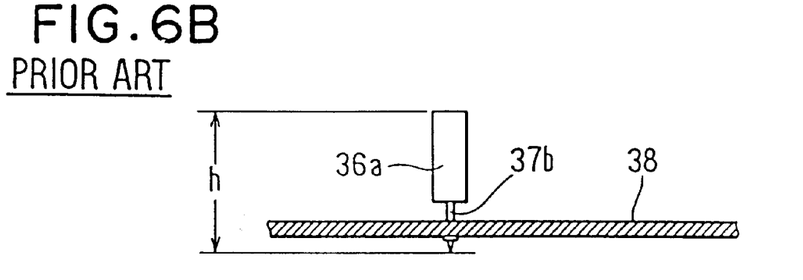
Figure 6C:
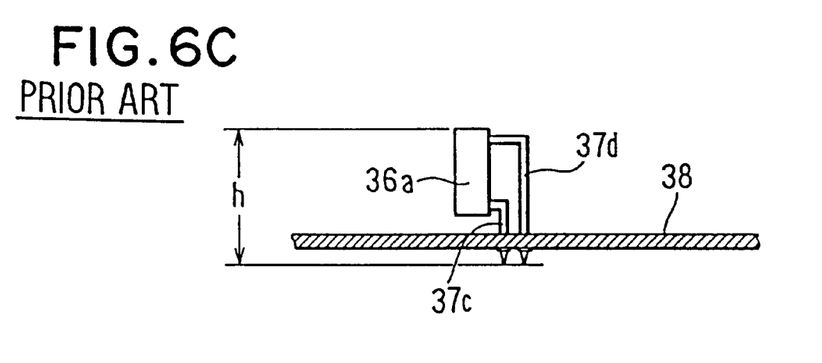

Japanese Patent Application Laid-Open No. Hei. 7-210622 describes a bar code reader having alternate structures such as those shown in FIGS. 6B and 6C in which a lead terminal 37b (or terminals 37c, 37d) directly affixes the sensor body 36a to the mounting substrate 38 without a sensor substrate, thereby reducing the overall height h of the sensor configuration.

More specifically, the component height h in FIG. 6B is the sum of the height of the sensor body 36a, the length of the lead terminal 37b, and the thickness of the mounting substrate. The component height h in FIG. 6C is the sum of the height of the sensor body, the length from the lower end of the sensor body to the bottom edge of the lead terminal protruding through the mounting substrate, and the thickness of the mounting substrate.

Alternatively, if the sensor body is positioned in direct contact with the mounting substrate, the component height in such a case would be the height of the sensor body plus the thickness of the mounting substrate and the length of the lead terminal protruding the bottom side of the mounting substrate.

In any case, the height h of the parts including the optical sensor and the mounting substrate will always be at least the height of the optical sensor plus the thickness of the mounting substrate. Therefore, even if the height of the other circuits disposed on the mounting substrate is small, the height of the optical sensor determines the thickness of the apparatus at the mounting substrate location in the above sensor configurations.

Due to the ongoing demand for smaller and easier to handle readers, it is desirable to minimize the size of the entire bar code reader apparatus. One way to reduce the size is to reduce the size of the reader handle, which is where the optical sensor configuration is located, to thereby enhance reader portability and to enable the handle to be more easily grasped. However, it is inherently difficult to reduce the thickness of the above-discussed prior art bar code reader due to the space required to mount the optical sensor on the mounting substrate.

SUMMARY OF THE INVENTION

In view of the above prior art limitations, it is an object of the present invention to provide an optical reader having an optical sensor configuration that enables the size of the reader to be reduced by greatly reducing the height of the optical sensor and mounting substrate combination when compared to prior art optical sensor configurations.

Specifically, the present invention provides a reader for optically reading target indicia. The reader includes an optical imaging system for taking light reflected from an object to be read and creating an image of the object from the reflected light. An optical sensor detects the image created by the optical imaging system so that the image can be processed. A mounting substrate defines a sensor aperture therein in which the optical sensor being is mounted to minimize a height of the optical sensor above the substrate.

In the above embodiment, the optical sensor is mounted partially within the sensor aperture, the overall height of the optical sensor and mounting substrate configuration, and consequently the sensor space requirements, are reduced compared to prior art configurations by a factor of at least the portion inserted through the sensor aperture. When the optical sensor is mounted within the sensor aperture so that the bottom surface of the sensor is co-planar with the bottom surface of the substrate, the height of the optical sensor and mounting substrate configuration is reduced to the height of the optical sensor. Therefore, the configuration thickness is reduced by at least a factor of the mounting substrate compared to prior art configurations. Accordingly, the optical reader of the present invention enables the overall size of the bar code reader to be reduced.

According to another embodiment of the present invention, an optical reader includes a mounting substrate, and an optical imaging system mounted to the mounting substrate for receiving reflected light from an object to be read, and for forming an image of the object from the reflected light. An optical sensor is electrically connected to the mounting substrate and is in optical communication with the optical imaging system.

The optical sensor includes an image-receiving surface for detecting the image formed by the optical imaging system for image processing purposes. This image-receiving surface is parallel with, and opposed to, a bottom surface of the mounting substrate. A light transmitting aperture is defined in the mounting substrate so that the image is transmitted from the optical imaging system through the light transmitting aperture and is incident on the image-receiving surface.

As with the above-discussed first embodiment, the second embodiment, through its uniquely arranged image sensor configuration enables the overall size of the reader to be substantially reduced when compared to conventional bar code readers.

The specific nature of the invention, as well as other objects, uses and advantages thereof, will clearly appear from the following description and from the accompanying drawings.

BRIEF DESCRIPTION OF THE DRAWINGS

FIG. 2A is a side view,

FIG. 2B is a plan view, and

FIG. 3A is a side view, and

FIG. 4A is a side elevation view,

FIG. 4B is a perspective view, and

DESCRIPTION OF THE PREFERRED EMBODIMENTS

Preferred embodiments to which the present invention is applied will be explained below with reference to the drawings. It should be appreciated that the modes of the invention are not limited to the embodiments described below, and the invention may take various modes within the technological scope of the invention.

Figure 1:
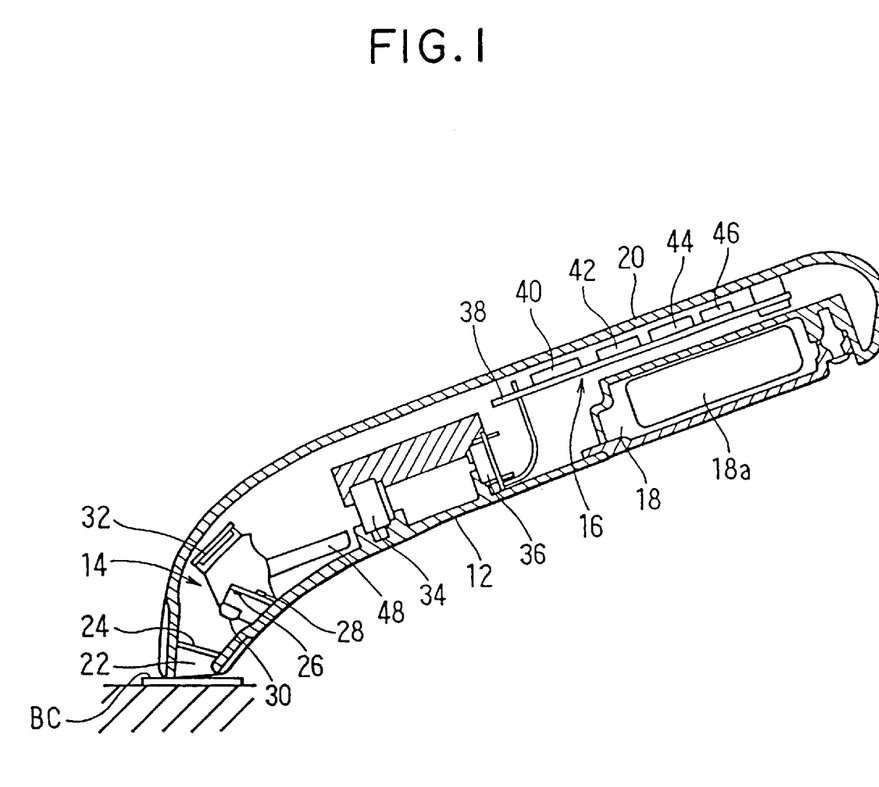
FIG. 1 is a side cross-sectional view of a conventional optical bar code reader.

FIG. 1 is a side cross-sectional view of a conventional bar code reader. The bar code reader comprises a housing 12, a reading section 14, a data processing and outputting section 16 and a power source section 18. The reading section 14 is disposed within the front portion of the case 12. A grip section 20 for enabling an operator to grip the bar code reader is formed at the rear portion of the housing 12. A reading opening 22 is provided at the lower part of the front portion of the housing 12, and a dust-proof plate 24 is disposed inside the reading opening 22 to enclose the opening and protect it from dust, dirt and other foreign matter that might compromise the operation of the reader.

The reading section 14 comprises an illuminating LED 26 for illuminating indicia, such as a bar-code, to be read, a driving circuit 28 for driving the LED, a condenser lens 30, a reflecting mirror 32, a lens-barrel 34 in which the imaging optical system is housed, and a linear optical sensor 36 in which light receiving elements form a row-like array.

The data processing and outputting section 16 within the housing 12 comprises, on a mounting substrate 38, a waveform-shaping section 40, a memory 42, a microcomputer 44 and an output circuit 46 for outputting signals to a main frame such as register and a host computer. A buzzer 48 is provided at the position where the reading section 14 is stored and where it will not affect the optical path, and emits a sound when the bar code BC is decoded successfully by the microcomputer 44. A battery 18a is stored in the power source section 18.

Figure 2A:
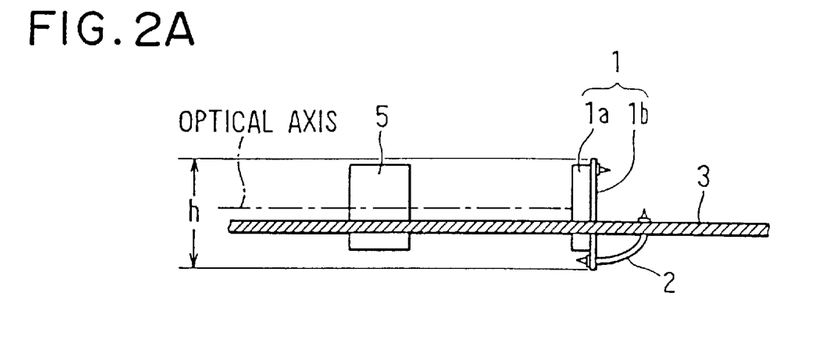
Figure 2B:
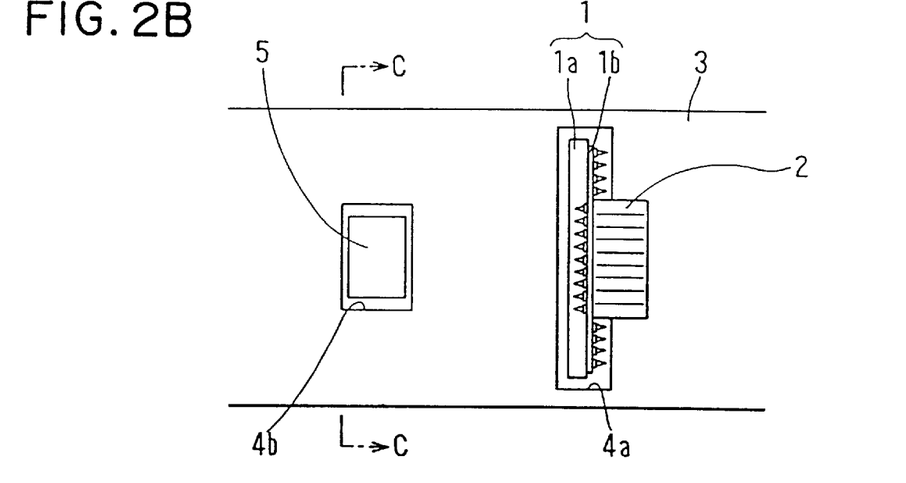
Figure 2C:
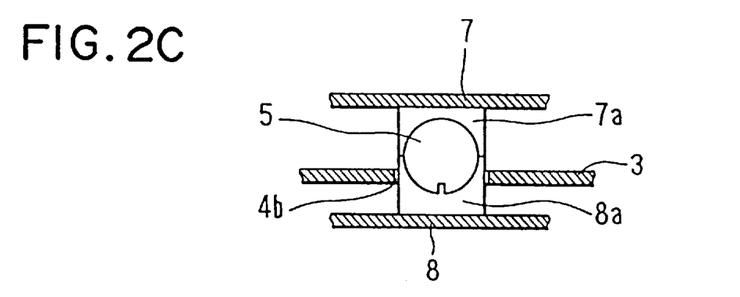
FIG. 2C is a section view taken along line C—C in FIG. 2B, of an optical reader configuration according to a first embodiment of the present invention.

FIGS. 2A, 2B and 2C illustrate an optical sensor configuration according to a first embodiment of the present invention that enables the size of a bar code reader such as that shown in FIG. 1 to be reduced. The sensor configuration includes an optical sensor 1, a mounting substrate 3 and a lens-barrel 5. The features of the optical sensor configuration that differ from the features of the above-discussed prior art configurations will now be discussed in detail.

The positional relationship between the optical sensor 1 and the mounting substrate 3 of the sensor configuration shown in FIGS. 2A–2C is different from the sensor configuration shown in FIGS. 1 and 6A–6C to reduce the thickness, and therefore the overall size, of the optical reader.

The optical sensor 1 itself is composed of a sensor body 1a, which is affixed to a sensor substrate 1b. The sensor body 1a of the present embodiment is a linear sensor in which light receiving elements form a row-like array, and is generally rectangular in shape. The sensor substrate 1b is also rectangular in shape, is slightly smaller in width than the sensor body (see FIG. 2B), and is longer than the sensor body in the lengthwise direction (see FIG. 2A). The sensor body and substrate combination extend through a sensor aperture 4a formed in the mounting substrate 3, and the lower portion of the sensor substrate extending through the sensor aperture is connected to the mounting substrate 3 via a flat wire 2.

Still referring to FIGS. 2A–2C, the lens-barrel 5 is generally cylindrical in shape, and houses an optical imaging system such as a conventional imaging lens and stop (not shown). Light reflected from target indicia being read is input through the optical imaging system within the lens barrel 5, and is output to the optical sensor 1. As with the image sensor, the lens-barrel 5 is mounted to the mounting substrate 3 within a lens-barrel aperture 4b so that a bottom portion protrudes below the bottom surface of the mounting substrate 3.

As shown in FIG. 2C, the lens-barrel 5 is held by holding members 7a, 8a, respectively. The holding member 7a extends from an upper case 7 attached to the optical reader housing (not shown), and the holding member 8a extends from a lower case 8, which is also attached to the optical reader housing. Although actually visible in the background but not shown in FIG. 2C, the optical sensor 1 is also held by holding members extending from upper and lower cases within the optical reader housing in the same manner as with the lens-barrel 5. Accordingly, the optical axis (see FIG. 2A) of the optical imaging system and of the optical sensor 1 may be adjusted by adjusting the positions of the cases 7, 8 within the housing.

Thus, because a portion of the optical sensor 1 is inserted through the sensor aperture 4a in the present embodiment, the height of the inserted portion, including the optical sensor 1 and the mounting substrate 3, is equal to the height of only the optical sensor 1. Therefore, as compared to prior art configurations, the overall thickness of the configuration is reduced by at least the thickness of the mounting substrate 3, therefore enabling the entire optical reader to be downsized.

Further, when the optical sensor 1 is inserted through the sensor aperture 4a of the mounting substrate 3, the optical imaging system must be shifted closer to the mounting substrate 3. This does not present a manufacturing problem if the size of the optical imaging system itself is small. However, if the size, i.e. the height, of the system is fairly significant, reducing the height of the optical sensor configuration may not have an effect on the overall height of the reader. Consequently, the size of the mounting substrate 3 must be reduced because of the size of the optical imaging system. According to the first embodiment, it is possible to avoid such a design limitation by inserting a part of the lens-barrel 5 into a lens-barrel aperture 4b formed in the mounting substrate.

It is noted that such a measure is not necessary when the lens-barrel 5 itself is disposed in the reader at a location where the mounting substrate 3 is not disposed. However, there is a possibility that decreasing the size of the apparatus may not be possible if the lens-barrel 5 is disposed where the mounting substrate 3 is not disposed. In other words, the lens-barrel 5 may be positioned on the mounting substrate 3 to reduce the overall size of the apparatus. In such a case, it is effective to insert the lens-barrel 5 into the lens-barrel aperture 4b on the mounting substrate 3 to locate the optical imaging system at a predetermined position with respect to the optical sensor 1.

Figure 3A:
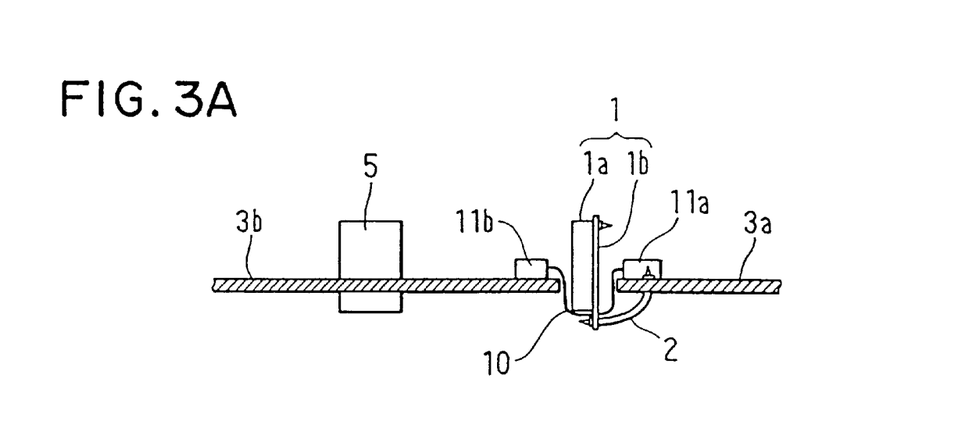
Figure 3B:
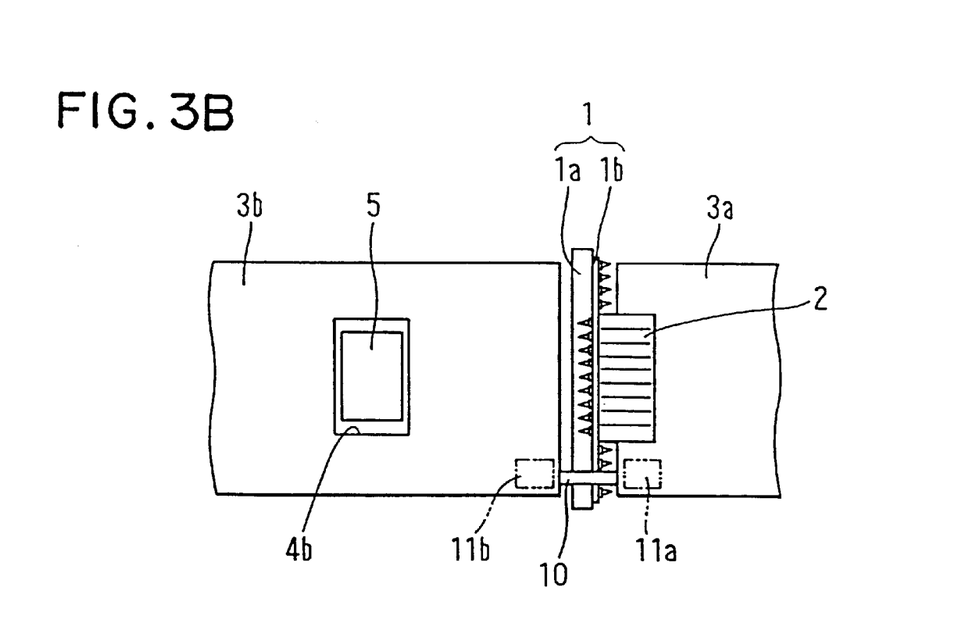
FIG. 3B is a plan view, of an optical reader configuration according to a second embodiment of the present invention.

Referring to FIGS. 3A–3B, although the optical sensor 1 is positioned within the sensor aperture 4a in the first embodiment, the aperture may be created between separate mounting substrates 3a, 3b according to a second embodiment.

In the first embodiment, the width of the mounting substrate 3 is greater than the width of the optical sensor 1 to enable the sensor aperture 4a to be formed (see FIG. 2B). However, as shown in FIG. 3B, the width of the mounting substrates 3a, 3b may be smaller than the width of the optical sensor 1. Such a configuration is preferable, as it enables the sensor configuration, and thus the optical reader, to be further reduced in size in the width direction.

It should be appreciated that the above-described configuration of the second embodiment requires that the divided mounting substrates 3a, 3b be connected. As a result, connectors 11a, 11b are provided on respective mounting substrates 3a, 3b to enable the divided substrates to be connected by a flexible substrate 10.

Figure 4A:
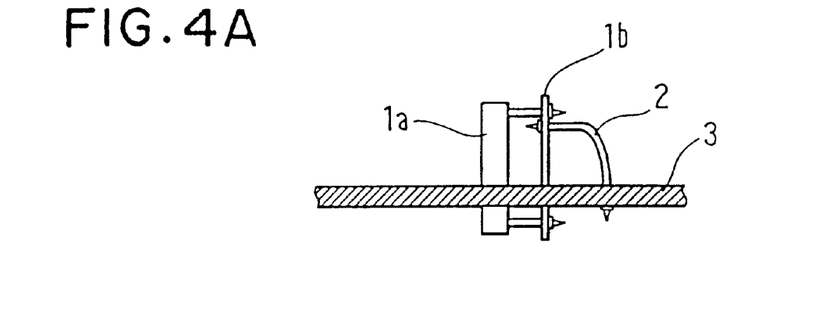

Additionally, the optical sensor configurations according to the first and second embodiments may adopt an alternative configuration in which the sensor body 1a and the sensor substrate 1b are separated by a predetermined aperture. The flat wire 2 is thus connected to the sensor substrate 1b so that one end thereof protrudes through the backside of the sensor body 1a as shown in FIG. 4A. Lead terminals protrude through upper and lower portions of the backside of the sensor body 1a, and the flat wire 2 protrudes through the portion therebetween.

Regarding the optical sensor 1 shown in FIGS. 2A–2C, the sensor body 1a is affixed to the sensor substrate 1b, and the height of the sensor substrate 1b is greater than the sensor body 1a to ensure connection of the flat wire 2 with the sensor substrate 1b. However, the sensor substrate may alternatively be approximately equal in height with that of the sensor body 1a, as the flat wire 2 may be disposed so that it protrudes through the back side of the sensor body 1a. Accordingly, the height of the optical sensor 1, and thus the overall size of the optical reader, may be further reduced.

Figure 4B:
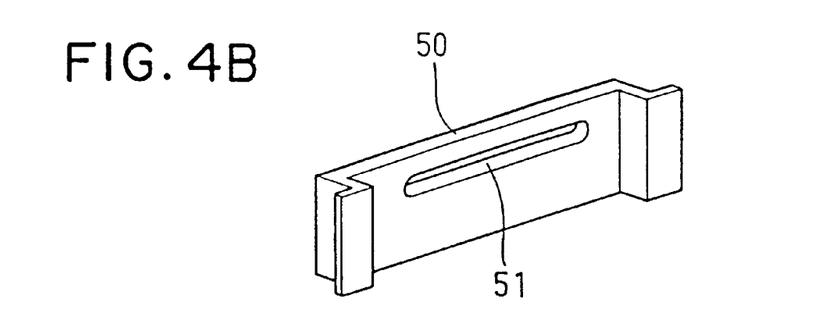
Figure 4C:
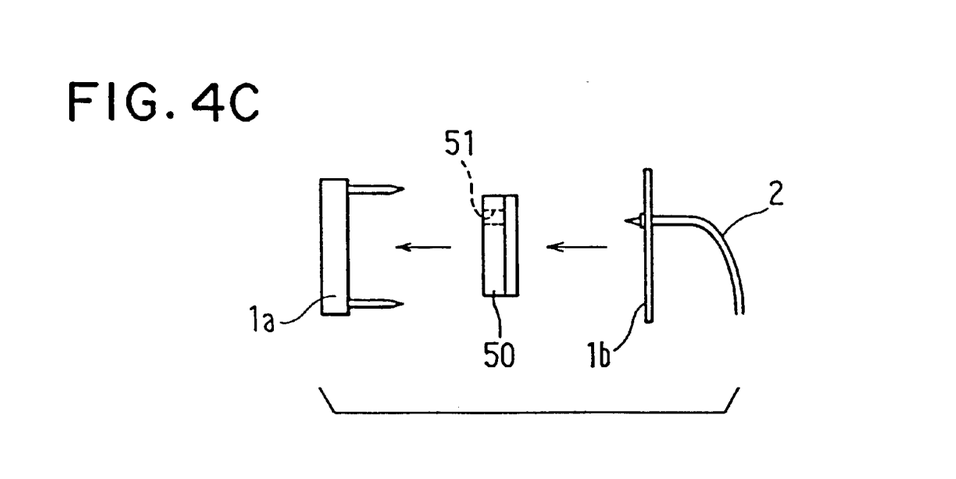
FIG. 4C is an exploded view, of alternative configurations of the optical readers shown in FIGS. 2A–2C and 3A–3B.

Also, a member 50 shown in FIGS. 4B and 4C may be disposed in the aperture between the sensor body 1a and the sensor substrate 1b. The member 50 is shaped to fill the aperture and has an insertion hole 51 which allows the flat wire 2 to be inserted and to protrude therethrough below the bottom surface of the sensor substrate.

The embodiments described above have been arranged so that the optical sensor 1 is vertically oriented relative to the mounting substrate 3, i.e., the light receiving plane of the sensor body 1a is perpendicular to the surface of the mounting substrate 3. However, referring to FIGS. 5C and 5D, the optical sensor 1 may alternatively be oriented relative to the mounting substrate so that the light receiving plane is parallel with the surface of the mounting substrate 3, and so that lead terminals 72, 92 which protrude out of the sensor bodies 70, 90 are directly connected to the mounting substrate 3. In such an arrangement, the orientation of the light receiving plane parallel to the surface of the mounting substrate 3 can be changed via a mirror 60 to an orientation that is vertical relative to the surface of the mounting substrate 3. Although the mirror 60 is additionally required in this configuration, the overall height may nonetheless be relatively reduced compared to the prior art and above-described vertical configurations.

Figure 5A:
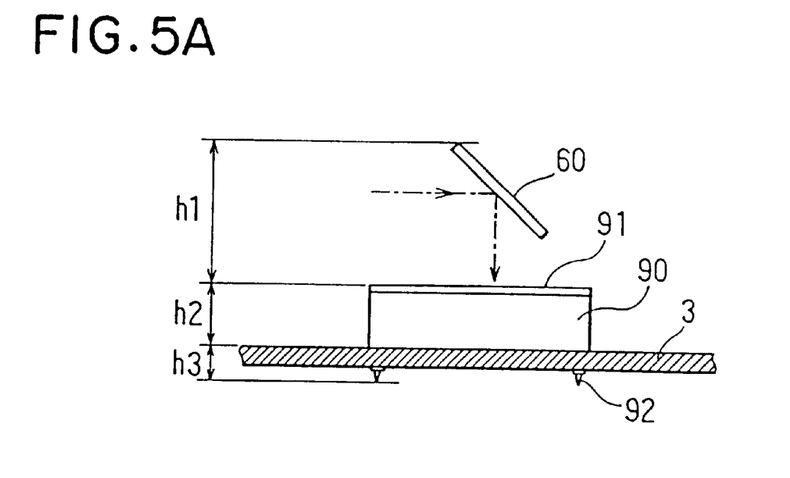
FIGS. 5A and 5B are schematic structural views of an optical sensor configuration of a prior art optical reader.
Figure 5B:
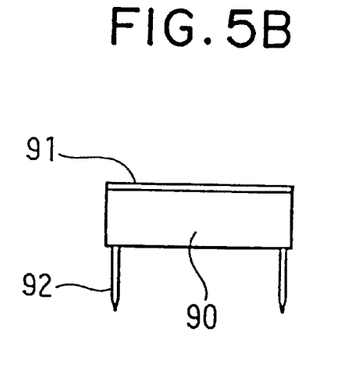
Figure 5C:
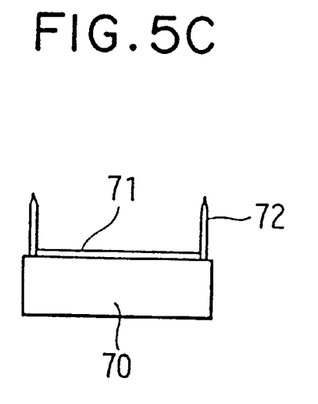
FIGS. 5C and 5D are schematic structural views of an optical sensor configuration of an optical reader according to a third embodiment of the present invention.

An example to illustrate the realization of the above-described size reduction follows. Referring to FIG. 5A, in a prior art optical sensor 90 incorporating such a direction-changing mirror, the lead terminal 92 protrudes from the light receiving plane through to the opposite side of the mounting substrate 3. Also, a cover glass 91 is provided as shown in FIG. 5B. When the lead terminal 92 is connected to the mounting substrate 3 as shown in FIG. 5A, the cover glass 91 is positioned at a predetermined distance above the top surface of the mounting substrate 3. Accordingly, the mirror 60 is positioned above the cover glass. When the distance from the cover glass 91 to the top of the mirror 60 is denoted as h1, the height of the optical sensor 90 as h2, and the thickness of the mounting substrate 3 and the protruding part of the lead terminal 92 as h3, the resulting overall height is h1+h2+h3.

Figure 5D:
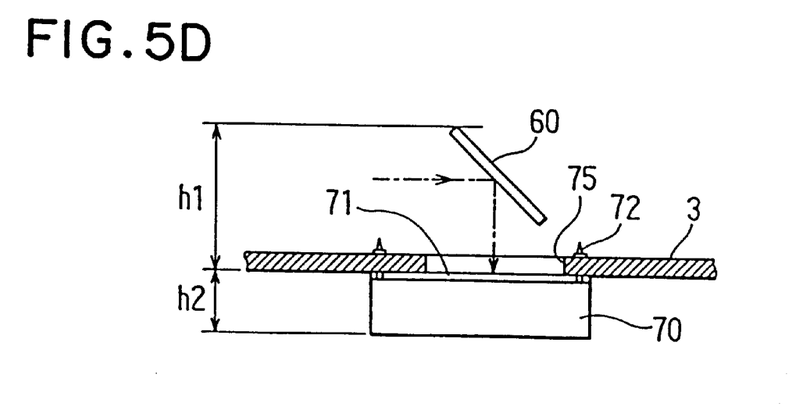

However, the optical sensor of the third embodiment of the present invention is arranged such that the lead terminal 72 protrudes through the side of the mounting substrate corresponding to the light-receiving plane, as is the cover glass 71. When the lead terminal 72 is connected to the mounting substrate 3 from the lower surface of the substrate as shown in FIG. 5D, the cover glass 71 is located between the bottom surface of the mounting substrate 3 and the image sensor 70. An aperture 75 formed in the mounting substrate 3 enables light reflected from the object being read to be reflected from the mirror 60 on the light receiving plane through to the image sensor 70.

Consequently, when the mirror 60 is positioned a predetermined distance above the cover glass 71, the mounting substrate and the protruding part of the lead terminal are positioned between the cover glass 71 and the mirror 60 as shown in FIG. 5D. When the distance from the cover glass 71 to the top of the mirror 60 is denoted as h1 and the height of the optical sensor 90 as h2, the overall height is only h1+h2. Therefore, the overall height of the optical reader is reduced by h3, which is the thickness of the mounting substrate 3 and the protruding part of the lead terminal 92, compared to the prior art configuration shown in FIGS. 5A and 5B.

Although the optical sensor has been assumed to be a linear sensor in each embodiment described above, it may also be an area sensor for reading two-dimensional codes. However, it should be appreciated that the object or indicia to be read is not confined only to a bar code or a two-dimensional code, and the invention may be applied to any type of object or indicia which is capable of being optically read. That is, the invention is characterized in the structure around the optical sensor and its use is not specifically limited. However, it is particularly effective in the field of optical readers where miniaturization and portability are desirable characteristics.

While the preferred embodiments have been described, variations thereto will occur to those skilled in the art within the scope of the present inventive concepts which are delineated by the following claims.

What is claimed is:

1. An optical reader comprising:
    a case;
    an optical imaging system disposed in the case and for imaging light reflected from an object at a predetermined position in the case;
    an optical sensor disposed at the predetermined position and for taking the reflected light and outputting a signal corresponding to the taken light;
    a reader for reading data of the object based on the signal from the optical sensor; and
    a circuit substrate having a sensor aperture formed completely through top and bottom surfaces of the circuit substrate, for mounting the reader thereon and connecting between the optical sensor and the reader electrically by a connecting wire,
        wherein the optical sensor is inserted in the sensor aperture so that a receiving plane of the optical sensor is perpendicular to the surface of the circuit substrate.

2. The optical reader of claim 1, wherein the case comprises an upper case and a lower case, and the optical sensor is supported and fixed by the upper case and the lower case.

3. The optical reader of claim 2, wherein the optical sensor comprises a sensor body having lead terminals and a sensor substrate for connecting and fixing the lead terminals that protrude from the sensor body separate from each other, and the sensor substrate and the circuit substrate are electrically connected to each other by the connecting wire, and one end of the connecting wire protrudes from the sensor substrate closer to a backside of the sensor body than the lead terminals that protrude from the sensor substrate.

4. The optical reader of claim 3, further comprising:
    a gap-filling member disposed in an opening defined between the sensor body and the sensor substrate and having an insertion aperture through which the connecting wire protruding from the backside of the sensor substrate is inserted.

5. The optical reader of claim 1, wherein the optical imaging system is housed within a lens-barrel, and the circuit substrate further defines a lens-barrel aperture within which the lens-barrel is mounted.

6. The optical reader of claim 5, wherein the case comprises an upper case and a lower case and the lens-barrel is supported and fixed by the upper and lower case.

7. The optical reader of claim 1, wherein a maximum height of a configuration of the optical sensor, the mounting substrate and the imaging system is a height of the optical sensor and a height of the mounting substrate.

8. An optical reader comprising:
    a case;
    an optical imaging system disposed in the case for imaging light reflected from an object at a predetermined position in the case;
    an optical sensor disposed at the predetermined position and for taking the reflected light and outputting a signal corresponding to the taken light;
    a reader for reading data of the object based on the signal from the optical sensor; and
    a circuit substrate having a sensor aperture formed completely through top and bottom surfaces of the circuit substrate, for mounting the optical imaging system and the reader thereon,
        wherein the optical sensor is directly mounted on the circuit substrate so that a receiving plane of the optical sensor is faced with the sensor aperture, and the reflected light from the object is imaged on the receiving plane of the optical sensor through the optical imaging system and the sensor aperture.

9. The optical reader of claim 8, wherein the optical imaging system is housed with a lens-barrel, and the circuit substrate further defines a lens-barrel aperture within which the lens-barrel is mounted.

10. The optical reader of claim 9, wherein the case comprises an upper case and a lower case, and the lens-barrel is supported and fixed by the upper and the lower case.

11. An optical reader comprising:
    a mounting substrate;
    at least one of a data processing component and a data outputting component mounted to the mounting substrate;
    an optical imaging system mounted to the mounting substrate for receiving reflected light from an object to be read, and for forming an image of the object from the reflected light;
    an optical sensor electrically connected to the mounting substrate and in optical communication with the optical imaging system, the optical sensor including an image-receiving surface for detecting the image formed by the optical imaging system for image processing purposes;
        wherein the image-receiving surface of the optical sensor is parallel with, and opposed to, a bottom surface of the mounting substrate; and
    a light transmitting aperture is defined in the mounting substrate so that the image is transmitted from the optical imaging system through the light transmitting aperture and is incident on the image-receiving surface.

12. The optical reader of claim 11, further comprising a lead terminal connected to the mounting substrate, wherein the lead terminal protrudes through a top surface of the mounting substrate.

13. The optical reader of claim 11, wherein the optical imaging system is housed within a lens-barrel, the mounting substrate defining a lens-barrel aperture in which the lens-barrel is mounted in optical communication with the optical sensor.

14. The optical reader of claim 11, further comprising a mirror mounted above a top surface of the mounting substrate to communicate the image formed by the optical imaging system to the optical sensor through the light transmitting aperture.

15. The optical reader of claim 11, further comprising a cover glass disposed between the bottom surface of the mounting substrate and a light-receiving surface.

16. A bar code reader for optically reading target bar code indicia, comprising:
    a mounting substrate including an image sensor mounting aperture;
    at least one of a data processing component and a data outputting component mounted to the mounting substrate; and
    an image sensor electrically connected to the mounting substrate and mounted partially within the image sensor mounting aperture to limit required space above the mounting substrate needed for housing the image sensor to a total of a height of the mounting substrate and a height of the image sensor, the image sensor for detecting an image of the bar code indicia to enable the bar code to be processed.

17. The bar code reader of claim 16, wherein the image sensor is mounted to an image sensor substrate that is electrically connected to the mounting substrate via a connecting wire.

18. The bar code reader of claim 16, wherein the image sensor is separated from the image sensor substrate by a predetermined distance, the predetermined distance defining a aperture within the image sensor mounting aperture.

19. The bar code reader of claim 18, further comprising an aperture member that is inserted in the aperture defined by the image sensor and the image sensor substrate, the aperture member including a connecting wire aperture through which the connecting wire protrudes.

20. The bar code reader of claim 16, further comprising an imaging system for defining an image of the target bar code indicia from light reflected from the bar code indicia, the imaging system being housed within an imaging system housing and being in optical communication with the optical sensor.

21. The bar code reader of claim 20, wherein the imaging system is mounted to the mounting substrate, the mounting substrate further defining an imaging system aperture in which the imaging system housing is at least partially mounted so that the imaging system housing extends only as high as the height of the image sensor above the mounting substrate.

22. An optical reader comprising:
   an optical imaging system for taking light reflected from an object to be read and creating an image of the object from the reflected light;
   a mounting substrate defining a sensor aperture therein;
   at least one of a data processing component and a data outputting component mounted to the mounting substrate; and
   an optical sensor for detecting the image created by the optical imaging system so that the image can be processed, the optical sensor being mounted in the sensor aperture, in an axial path of the mounting substrate, to minimize a height of the optical sensor above the mounted substrate;
   wherein the mounting substrate comprises first and second substrate sections, and the sensor aperture is defined between the first and second substrate sections.

23. An optical reader comprising:
   a case;
   an optical imaging system disposed in the case and for imaging light reflected from an object at a predetermined position in the case;
   a circuit substrate having an aperture formed completely through top and bottom surfaces of the circuit substrate, the circuit substrate including connecting wire;
   an optical sensor disposed at the predetermined position, in the aperture of the circuit substrate, so that a receiving plane of the optical sensor is perpendicular to the surface of the circuit substrate and for taking the reflected light and outputting a signal corresponding to the taken light; and
   a reader mounted on the circuit substrate for reading data of the object based on the signal from the optical sensor;
   wherein the optical sensor and the reader are electrically connected by the connecting wire on the circuit substrate.

* * * * *